US012811335B2

(12) United States Patent
Rachi et al.

(10) Patent No.: US 12,811,335 B2
(45) Date of Patent: Nov. 24, 2026

(54) WIRE ASSEMBLY

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hironobu Rachi, Mie (JP); Kazuo Nakashima, Mie (JP); Yusaku Maeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 353 days.

(21) Appl. No.: 18/713,917

(22) PCT Filed: Nov. 28, 2022

(86) PCT No.: PCT/JP2022/043809

§ 371 (c)(1),
(2) Date: May 28, 2024

(87) PCT Pub. No.: WO2023/112654

PCT Pub. Date: Jun. 22, 2023

(65) Prior Publication Data

US 2024/0356271 A1 Oct. 24, 2024

(30) Foreign Application Priority Data

Dec. 13, 2021 (JP) ................................ 2021-201547

(51) Int. Cl.
*H01R 13/52* (2006.01)
*H01R 13/66* (2006.01)

(52) U.S. Cl.
CPC ..... *H01R 13/5216* (2013.01); *H01R 13/6683* (2013.01)

(58) Field of Classification Search
CPC ............ H01R 13/5216; H01R 13/6683; H01B 7/02; H01B 7/0275; H01B 7/08; H01B 7/0807;
(Continued)

(56) References Cited

U.S. PATENT DOCUMENTS 10,176,908 B2 * 1/2019 Tanaka ................. H01B 7/0009
10,388,432 B2 * 8/2019 Tanaka ..................... H01B 7/30
(Continued)

FOREIGN PATENT DOCUMENTS

JP 2016-104543 A 6/2016

OTHER PUBLICATIONS

International Search Report issued on Feb. 21, 2023 for WO 2023/112654 A1 (4 pages).

*Primary Examiner* — Gary F Paumen
(74) *Attorney, Agent, or Firm* — Venjuris, P.C.

(57) ABSTRACT

A wire assembly includes a wire including a conductor and a resin coating, an end member connected to the conductor at an end part of the wire, and a resin molded member for covering a region from the end member to the resin coating. A value of Y1 is 30 or more. $Y1=1.26\times X1-5.02\times 10^3\times X2+1.55\times 10^3\times X4-2.36\times 10^{-1}\times X5+93$. X1 is an adhesion work of the resin molded member and the resin coating and has a unit of $mJ/m^2$. X2 is a difference between distortion of the resin molded member and distortion of the resin coating and has no unit. X4 is a difference between a linear expansion coefficient of the resin molded member and a linear expansion coefficient of the resin coating and has a unit of 1/° C.
(Continued)

X5 is an elastic modulus of the resin coating and has a unit of MPa.

6 Claims, 2 Drawing Sheets

(58) Field of Classification Search
CPC ...... H01B 7/0823; H01B 7/0853; H01B 7/28; H01B 7/30
USPC ............. 439/587; 174/72 A, 74 R, 75 R, 76, 174/77 R, 80, 110 R, 110 SR, 110 D, 174/110 N, 113 R, 117 R, 117 F
See application file for complete search history.

(56) References Cited

U.S. PATENT DOCUMENTS

| | | | | |
|---|---|---|---|---|
| 10,388,433 | B2 * | 8/2019 | Tanaka | H01B 3/441 |
| 10,699,824 | B2 * | 6/2020 | Tanaka | H01B 3/441 |
| 10,699,825 | B2 * | 6/2020 | Tanaka | H01B 7/30 |
| 10,770,772 | B2 * | 9/2020 | Suenaga | H01B 13/003 |
| 10,964,452 | B2 * | 3/2021 | Tanaka | H01B 11/02 |
| 2017/0229212 | A1 | 8/2017 | Hayakawa et al. | |
| 2019/0013560 | A1 | 1/2019 | Suenaga et al. | |
| 2019/0198194 | A1 | 6/2019 | Hayakawa et al. | |

* cited by examiner

WIRE ASSEMBLY

CROSS REFERENCE TO RELATED APPLICATIONS

This application is a national phase of PCT application No. PCT/JP2022/043809, filed on 28 Nov. 2022, which claims priority from Japanese patent application No. 2021-201547, filed on 13 Dec. 2021, all of which are incorporated herein by reference.

TECHNICAL FIELD

The present disclosure relates to a wire assembly.

BACKGROUND

Patent Document 1 discloses a composite cable in which a first wire and a multi-core wire are collectively covered by a sheath. The multi-core wire is configured such that a plurality of second wires are covered by an inner sheath. The second wire is provided with a conductor and an insulation layer. The inner sheath is a resin coating arranged on the outmost periphery of the multi-core wire. An end member and a resin molded member are provided on an end part of the multi-core wire. The end member is a sensor to be electrically connected to the conductors of the second wires or the like. The resin molded member covers a region from the end member to the outer periphery of the inner sheath. A connected part of the conductors and the end member is waterproofed by the resin molded member.

Prior Art Document

Patent Document

Patent Document 1: JP 2017-131054 A

SUMMARY OF THE INVENTION

A wire assembly of the present disclosure is provided with a wire including a conductor and a resin coating, an end member connected to the conductor at an end part of the wire, and a resin molded member for covering a region from the end member to the resin coating, a value of Y1 obtained by Equation (A) below being 30 or more, $$Y1 = 1.26 \times X1 - 5.02 \times 10^3 \times X2 + 1.55 \times 10^3 \times X4 - 2.36 \times 10^{-1} \times X5 + 93 \quad \text{Equation (A)}$$

where:

X1 . . . adhesion work of the resin molded member and the resin coating, having a unit of $mJ/m^2$, X2 . . . difference between distortion of the resin molded member and distortion of the resin coating, having no unit, X4 . . . difference between a linear expansion coefficient of the resin molded member and a linear expansion coefficient of the resin coating, having a unit of 1/°C, and X5 . . . elastic modulus of the resin coating, having a unit of MPa.

Another wire assembly of the present disclosure is provided with a wire including a conductor and a resin coating, an end member connected to the conductor at an end part of the wire, and a resin molded member for covering a region from the end member to the resin coating, a value of Y2 obtained by Equation (B) below being 30 or more, $$Y2 = -3.59 \times 10^3 \times X2 + 4.99 \times 10 \times X3 - 1.20 \times 10^5 \times X4 - 2.65 \times 10^{-1} \times X5 + 139 \quad \text{Equation (B)}$$

where:

X2 . . . difference between distortion of the resin molded member and distortion of the resin coating, having no unit, X3 . . . shear adhesion strength of the resin molded member and the resin coating, having a unit of MPa, X4 . . . difference between a linear expansion coefficient of the resin molded member and a linear expansion coefficient of the resin coating, having a unit of 1/ °C, and X5 . . . elastic modulus of the resin coating, having a unit of MPa.

DETAILED DESCRIPTION TO EXECUTE THE INVENTION

Technical Problem

Figure 1:
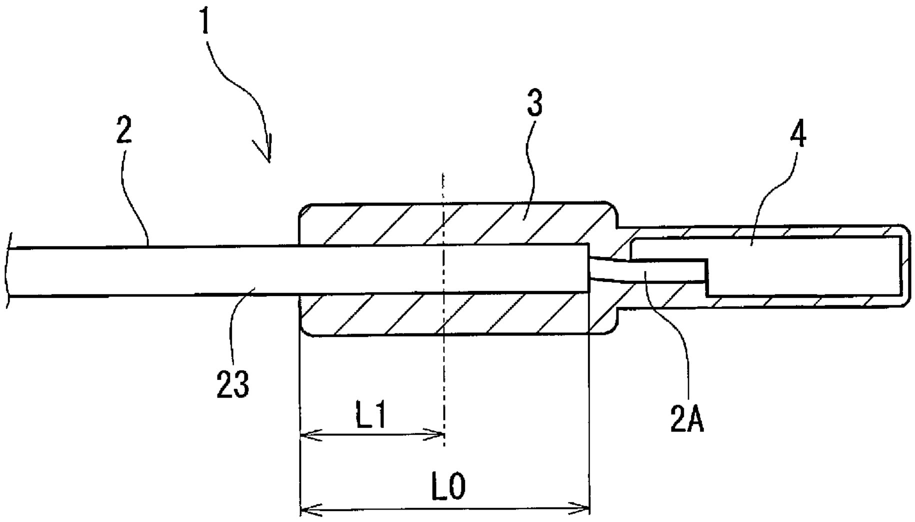
FIG. 1 is a schematic diagram of a wire assembly described in an embodiment.

To waterproof the connected part, the resin molded member and the inner sheath, which is a resin coating, need to be tightly adhered. However, depending on the affinity of a resin constituting the resin molded member and a resin constituting the resin coating, sufficient waterproof performance may not be obtained. This affinity possibly changes depending on grades of the resins, molecular weights of the resins, ratios of additives contained in the resins or the like. For example, there is a difference in adhesive ability to the resin coating between a resin molded member made of a resin A and a resin molded member made of the resin A containing an additive.

In view of the above situation, one object of the present disclosure is to provide a wire assembly having good waterproof performance between a resin molded member and a resin coating.

Effect of Invention

A wire assembly of the present disclosure is excellent in waterproof performance between a resin molded member and a resin coating in the wire assembly.

Description of Embodiments of Present Disclosure

The present inventors studied to specify a physical quantity related to adhesiveness between a resin molded member and a resin coating and evaluate waterproofness between the resin molded member and the resin coating based on whether or not that physical quantity is equal to or more than a predetermined value. That resulted in acquiring knowledge that sufficient waterproofness was ensured between the resin molded member and the resin coating in the wire assembly satisfying Equation (A) or Equation (B). Equations (A) and Equation (B) are described in detail later. The wire assembly of the present disclosure was obtained based on the above knowledge.

First, contents of embodiments of the present disclosure are listed and described.

(1) A wire assembly according to an embodiment is provided with a wire including a conductor and a resin coating, an end member connected to the conductor at an end part of the wire, and a resin molded member for covering a region from the end member to the resin coating, a value of Y1 obtained by Equation (A) below being 30 or more, $$Y1 = 1.26 \times X1 - 5.02 \times 10^3 \times X2 + 1.55 \times 10^3 \times X4 - 2.36 \times 10^{-1} \times X5 + 93 \quad \text{Equation (A)}$$

where:

X1 . . . adhesion work of the resin molded member and the resin coating, having a unit of $mJ/m^2$, X2 . . . difference between distortion of the resin molded member and distortion of the resin coating, having no unit, X4 . . . difference between a linear expansion coefficient of the resin molded member and a linear expansion coefficient of the resin coating, having a unit of 1/°C, and X5 . . . elastic modulus of the resin coating, having a unit of MPa.

Equation (A) is an equation for estimating a leak pressure of the wire assembly based on physical quantities X1, X2, X4 and X5 related to adhesiveness between the resin molded member and the resin coating. That is, Y1 is an estimated value of the leak pressure obtained from the physical quantities X1, X2, X4 and X5. The physical quantities X1, X2, X4 and X5 are described in detail later. The leak pressure is obtained when the wire assembly is subjected to a predetermined leak test. The leak test is a test for examining whether or not air leaks from an interface between the resin coating and the resin molded member when air is fed into the inside of the resin coating of the wire by an air pump as shown in Test Example 1 to be described later. The leak pressure is a value of a pressure meter of the air pump when air leaks from the interface. A unit of the leak pressure is kPa. That is, if Y1 obtained from Equation (A) is 30, the leak pressure of the wire assembly is estimated to be 30 kPa.

If the leak pressure is 30 kPa or more, waterproofness between the resin molded member and the resin coating can be judged to be sufficiently high. Accordingly, if the value of Y1 obtained by substituting the physical quantities X1, X2, X4 and X5 obtained by examining the wire assembly into Equation (A) is 30 or more, that wire assembly can be said to have sufficient waterproof performance.

(2) Another wire assembly according to an embodiment is provided with a wire including a conductor and a resin coating, an end member connected to the conductor at an end part of the wire, and a resin molded member for covering a region from the end member to the resin coating, a value of Y2 obtained by Equation (B) below being 30 or more, $$Y2 = -3.59 \times 10^3 \times X2 + 4.99 \times 10 \times X3 - 1.20 \times 10^5 \times X4 - 2.65 \times 10^{-1} \times X5 + 139 \quad \text{Equation (B)}$$

where:

X2 . . . difference between distortion of the resin molded member and distortion of the resin coating, having no unit, X3 . . . shear adhesion strength of the resin molded member and the resin coating, having a unit of MPa, X4 . . . difference between a linear expansion coefficient of the resin molded member and a linear expansion coefficient of the resin coating, having a unit of 1/°C, and X5 . . . elastic modulus of the resin coating, having a unit of MPa.

Equation (B) is an equation for estimating a leak pressure of the wire assembly based on physical quantities X2, X3, X4 and X5 related to adhesiveness between the resin molded member and the resin coating. That is, Y2 is an estimated value of the leak pressure obtained from the physical quantities X2, X3, X4 and X5. The physical quantities X2, X3, X4 and X5 are described in detail later. The physical quantities X2,X4 and X5 are the same as the physical quantities X2, X4 and X5 in <1>described above. The definition of the leak pressure is the same as in <1>described above. If Y2 obtained from Equation (B) is 30, the leak pressure of the wire assembly is estimated to be 30 kPa.

If the leak pressure is 30 kPa or more, waterproofness between the resin molded member and the resin coating can be judged to be sufficiently high. Accordingly, if the value of Y2 obtained by substituting the physical quantities X2, X3, X4 and X5 obtained by examining the wire assembly into Equation (B) is 30 or more, that wire assembly can be said to have sufficient waterproof performance.

(3) In the wire assembly of (1) or (2) described above, the resin molded member covers the entire end member.

In the wire assembly in which the resin molded member covers the entire end member, only the interface between the resin molded member and the resin coating is a moisture intrusion route into a connected part of the conductor of the wire and the end member. Since waterproofness between the resin molded member and the resin coating is high in the wire assembly of the embodiment, moisture hardly adheres to the connected part. Therefore, the corrosion of the conductor, the damage of the end member or the like is suppressed.

(4) In the wire assembly of any one of (1) to (3) described above, a main component of the resin molded member is a polyamide resin, a polyphenylene sulfide resin or a polybutylene terephthalate resin.

These resins are excellent in heat resistance and suitable as a material of the resin molded member.

(5) In the wire assembly of any one of (1) to (4) described above, a main component of the resin coating is a polyester or a polyurethane.

These resins are excellent in flexibility and suitable for the resin coating of the wire required to be easily bent.

(6) In the wire assembly of any one of (1) to (5) described above, the end member is a sensor.

If the end member is a sensor, a physical quantity in a device installed with the wire assembly can be measured. For example, if the wire assembly is installed in a vehicle, the sensor can monitor a physical quantity related to a vehicle operation. The type of the sensor is not particularly limited.

DETAILS OF EMBODIMENT OF PRESENT DISCLOSURE

Hereinafter, an embodiment of the present disclosure is described in detail with reference to the drawings as appropriate. The same reference signs in figures denote the same components. The present invention is not limited to the illustrated embodiment, but is represented by claims and intended to include all changes in the scope of claims and in the meaning and scope of equivalents.

<Embodiment>

A wire assembly 1 of this example shown in FIG. 1 is provided with a wire 2, a resin molded member 3 and an end member 4. One feature of the wire assembly 1 of this example is that a resin coating 23 arranged on the outermost periphery of the wire 2 and the resin molded member 3 are firmly adhered. Each component of the wire assembly 1 is described below. Thereafter, indices indicating sufficient waterproofness between the resin coating 23 and the resin molded member 3 due to firm adhesion of the resin coating 23 and the resin molded member 3 are described.

<<Wire>>

Figure 2:
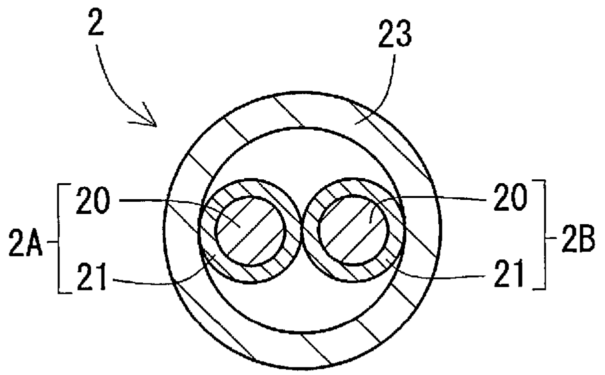
FIG. 2 is a section of a wire described in the embodiment.

As shown in a section of FIG. 2, the wire 2 of this example is a multi-core wire, i.e. so-called a twisted pair cable. The wire 2 of this example is provided with two core wires 2A, 2B. The core wires 2A, 2B of this example have the same configuration. The number of the core wires is not particularly limited. A plurality of core wires may respectively have different configurations. Unlike this example, the wire 2 may be a single-core wire.

The core wire 2A, 2B includes a conductor 20 and an insulation layer 21. The conductor 20 is made of an electrically conductive material such as aluminum, aluminum alloy, copper or copper alloy. The conductor 20 is electrically connected to the end member 4 (FIG. 1). The insulation layer 21 is, for example, made of insulating resin such as polyvinyl chloride or polyethylene.

The two core wires 2A, 2B are arranged inside the tube-like resin coating 23. The resin coating 23 of this example is a so-called sheath. In this example, there is a gap between the core wires 2A, 2B and the resin coating 23. Unlike this example, a substance such as a resin may be filled between the core wires 2A, 2B and the resin coating 23. The filled substance is, for example, a urethane resin. A shielding layer and the like may be provided on an inner peripheral side of the resin coating 23.

As shown in FIG. 1, a part of the resin molded member 3 is arranged on the outer periphery of the resin coating 23. The inner peripheral surface of the resin molded member 3 is adhered to the outer peripheral surface of the resin coating 23. A main component of the resin coating 23 is a resin material. The main component means a component having a content of 50 mass % or more in the resin coating 23. The resin material is, for example, a polyurethane (PU) resin, a polyester (PE) resin or the like. The resin coating 23 may contain an additive such as a flame retardant or filler or the like.

Here, even if the same resin material for constituting the resin coating 23 is used, adhesiveness between the resin coating 23 and the resin molded member 3 changes depending on the number of branched chains of the resin material, a molecular weight, the type of an additive contained in the resin coating 23 and a content of the additive. Therefore, even if the resin coating 23 is, for example, made of PU resin, it may not be possible to satisfy a value of Equation (A) or Equation (B) to be described later.

<<End Member>>

The end member 4 shown in FIG. 1 is electrically connected to the conductors 20 (FIG. 2) of the wire 2. The end member 4 of this example is a vehicle wheel speed sensor. The sensor is not limited to the vehicle wheel speed sensor. For example, the sensor may be a temperature sensor, an acceleration sensor or the like. Unlike this example, the end member 4 may be a terminal or the like.

<<Resin Molded Member>>

The resin molded member 3 covers a region from the end member 4 to the resin coating 23. In this example, the resin molded member 3 covers the entire end member 4.

The resin molded member 3 is overlaid on the outer periphery of the resin coating 23 of the wire 2. That is, the inner peripheral surface of the resin molded member 3 is adhered to the outer peripheral surface of the resin coating 23. The adhesion of moisture to a connected part of the conductors 20 (FIG. 2) of the wire 2 and the end member 4 is suppressed by the resin molded member 3. As an overlap length L0 of the resin molded member 3 and the resin coating 23 along a length direction of the wire 2 increases, waterproofness by the resin molded member 3 is improved. The length direction is a direction from a first end part to a second end part of the wire 2 along a length of the wire 2. If the length L0 is too long, the resin molded member 3 is enlarged and it becomes difficult to arrange the wire assembly 1 in a device. From the perspective of improving waterproofness and suppressing enlargement, the length L0 is preferably, for example, 1mm or more and 100 mm or less. Further, the length L0 may be 5 mm or more and 50mm or less.

If the wire 2 is a single-core wire unlike this example, the resin molded member 3 covers the outer periphery of the insulation layer 21 arranged on the outer periphery of the conductor 20. That is, the insulation layer 21 is equivalent to the resin coating of the wire 2 in the wire assembly provided with the single-core wire.

The outer shape of the resin molded member 3 is not particularly limited. The outer shape of the resin molded member 3 of this example is a shape along the outer shape of the end member 4. Unlike this example, the resin molded member 3 may be provided with a flange or the like for fixing the wire assembly 1 to an installation target.

A main component of the resin molded member 3 is a resin material. The main component means a component having a content of 50 mass % or more in the resin molded member 3. The resin material is, for example, a polyamide (PA) resin, a polyphenylene sulfide (PPS) resin, a polybutylene terephthalate (PBT) resin or the like. The resin molded member 3 may contain an additive such as a flame retardant or filler or the like.

Here, even if the same resin material for constituting the resin molded member 3 is used, adhesiveness between the resin coating 23 and the resin molded member 3 changes depending on the number of branched chains of the resin material, a molecular weight, the type of an additive contained in the resin molded member 3 and a content of the additive. Therefore, even if the resin molded member 3 is, for example, made of PA resin, it may not be possible to satisfy a value of Equation (A) or Equation (B) to be described later.

<<Waterproofness Index>>

Waterproofness between the resin molded member 3 and the resin coating 23 in the wire assembly 1 can be evaluated by a leak pressure. The leak pressure is obtained by conducting a leak test for Test Example 1 to be described later. The leak test is a test for examining whether or not air leaks from an interface between the resin coating 23 and the resin molded member 3 when air is fed into the inside of the resin coating 23 of the wire 2 by an air pump. The leak pressure is a value of a pressure meter of the air pump when air leaks from the interface. If the leak pressure is 30 kPa or more, the waterproofness of the wire assembly 1 can be judged to be sufficient. If the leak pressure is 50 kPa or more, the waterproofness of the wire assembly 1 can be judged to excellent.

The wire assembly 1 of this example satisfies that a value of Y1 obtained by the following Equation (A) or a value of Y2 obtained by the following Equation (B) is 30 or more. Equation (A) and Equation (B) are equations for estimating a leak pressure of the wire assembly 1 based on physical quantities obtained by examining the wire assembly 1. A unit of Y1 and Y2 is kPa. Accordingly, if Y1 or Y2 is 30, the leak pressure is estimated to be 30 kPa. By obtaining Y1 or Y2, waterproofness between the resin molded member 3 and the resin coating 23 can be evaluated without conducting the leak test.

$$Y1 = 1.26 \times X1 - 5.02 \times 10^3 \times X2 + 1.55 \times 10^3 \times X4 - 2.36 \times 10^{-1} \times X5 + 93 \quad \text{Equation (A)}$$

where:

X1 . . . adhesion work of the resin molded member 3 and the resin coating 23, X2 . . . difference between distortion of the resin molded member 3 and that of the resin coating 23, X4 . . . difference between a linear expansion coefficient of the resin molded member 3 and that of resin coating 23, and X5 . . . elastic modulus of the resin coating 23.

$$Y2 = -3.59 \times 10^3 \times X2 + 4.99 \times 10 \times X3 - 1.20 \times 10^5 \times X4 - 2.65 \times 10^{-1} \times X5 + 139 \quad \text{Equation (B)}$$

where:

X2 . . . same as X2 in Equation (A),

X3 . . . shear adhesion strength of the resin molded member 3 and the resin coating 23, X4 . . . same as X4 in Equation (A), and X5 . . . same as X5 in Equation (A).

Equation (A) and Equation (B) are obtained by multiple regression analysis of data of Test Example 1 to be described later. The multiple regression analysis is the calculation of a regression equation representing an objective variable by a plurality of explanatory variables. In the case of this example, X1, X2, X3, X4 and X5 are equivalent to explanatory variables, and Y1, Y2 are equivalent to objective variables. X1 to X5 to be substituted into Equation (A) or Equation (B) are described in detail below.

<<Adhesion Work>>

X1 of Equation (A) is the adhesion work. A unit of X1 is $mJ/m^2$.

The adhesion work is an index indicating the magnitude of adhesiveness between the resin molded member 3 and the resin coating 23. That is, the adhesion work is an index indicating peeling difficulty of the resin coating 23 from the resin molded member 3 and also an index for evaluating waterproofness between the resin molded member 3 and the resin coating 23.

The adhesion work is obtained from a surface free energy of the resin molded member 3 and that of the resin coating 23. A surface free energy is equivalent to a surface tension on a solid. To obtain the adhesion work, the surface free energy of the resin molded member 3 and that of the resin coating 23 are first obtained. The surface free energy is obtained by using a Young equation and an expansion Fowkes formula described below.

$$\gamma_s = \gamma_L \cos\theta + \gamma_{SL} \quad \text{Young Equation}$$

where:

$\theta$ . . . contact angle of liquid droplets stationary on a surface of a solid; a unit is $(\pi/180)$ rad, $\gamma_s$ . . . surface tension of the solid, i.e. surface free energy; a unit is $mJ/m^2$, $\gamma_L$ . . . surface tension of a liquid constituting the liquid droplets; a unit is $mJ/m^2$, and $\gamma_{SL}$ . . . surface tension between the solid and the liquid; a unit is $mJ/m^2$ $$\gamma_{SL} = \gamma_S + \gamma_L - 2(\gamma_S^d \gamma_L^d)^{1/2} - 2(\gamma_S^P \gamma_L^P)^{1/2} - 2(\gamma_S^H \gamma_L^H)^{1/2} \quad \text{Expansion Fowkes Formula}$$

where:

$\gamma_L^d$ . . . dispersion component in the surface tension of the liquid, $\gamma_L^P$ . . . polar component in the surface tension of the liquid, $\gamma_L^H$ . . . hydrogen bonding component in the surface tension of the liquid, $\gamma_S^d$ . . . dispersion component in the surface free energy of the solid, $\gamma_S^P$ . . . polar component in the surface free energy of the solid, and $\gamma_S^H$ . . . hydrogen bonding component in the surface free energy of the solid.

The unit of each component of the surface tension is $mJ/m^2$, and the unit of each component of the surface free energy is $mJ/m^2$. Note that an induction component is also present in the surface tension, but the induction component may be ignored since being very small.

If the Young equation is substituted into the expansion Fowkes formula, the following equation (1) is obtained.

$$\gamma_L(1 + \cos\theta) = 2(\gamma_S^d \gamma_L^d)^{1/2} + 2(\gamma_S^P \gamma_L^P)^{1/2} + 2(\gamma_S^H \gamma_L^H)^{1/2} \quad \text{Equation (1)}$$

The surface free energy of the solid is obtained by causing three types of liquids whose $\gamma_L$, $\gamma_L^d$, $\gamma_L^P$ and $\gamma_L^H$ are known to adhere to the solid and measuring the contact angle θ. For example, to obtain $\gamma_S^d$, $\gamma_S^P$ and $\gamma_S^H$ related to the surface free energy of the resin molded member 3, a first liquid, a second liquid and a third liquid having known numerical values of the surface tension are respectively caused to adhere to the resin molded member 3 and three linear equations with three unknowns are obtained. By solving the three linear equations with three unknowns, $\gamma_S^d$, $\gamma_S^P$ and $\gamma_S^H$ are obtained. A liquid having the respective known components of the surface tension is, for example, pure water. The surface free energy of the resin coating 23 is also obtained in the same way as that of the resin molded member 3.

The adhesion work is obtained by the following Dupre equation.

$$\gamma_{12} + W = \gamma_1 + \gamma_2 \quad \text{Dupre Equation}$$

where:

W . . . adhesion work; a unit is mJ/m$^2$, $\gamma_{12}$ . . . interface free energy; a unit is mJ/m$^2$, $\gamma_1$ . . . surface free energy of the resin molded member 3, and $\gamma_2$ . . . surface free energy of the resin coating 23

Here, $\gamma_{12}$ is obtained by the following expansion Fowkes formula.

$$\gamma_{12} = \gamma_1 + \gamma_2 - 2(\gamma_1^d\gamma_2^d)^{1/2} - 2(\gamma_1^P\gamma_2^P)^{1/2} - 2(\gamma_1^H\gamma_2^H)^{1/2} \quad \text{Expansion Fowkes Formula}$$

where:

$\gamma_1^d$ . . . dispersion component in the surface free energy of the resin molded member 3, $\gamma_1^P$ . . . polar component in the surface free energy of the resin molded member 3, $\gamma_1^H$ . . . hydrogen bonding component in the surface free energy of the resin molded member 3, $\gamma_1^d$ . . . dispersion component in the surface free energy of the resin coating 23, $\gamma_1^P$ . . . polar component in the surface free energy of the resin coating 23, and $\gamma_1^H$ . . . hydrogen bonding component in the surface free energy of the resin coating 23.

If the expansion Fowkes formula is substituted into the Dupre equation, the following equation (2) is obtained.

$$W = 2(\gamma_1^d\gamma_2^d)^{1/2} + 2(\gamma_1^P\gamma_2^P)^{1/2} + 2(\gamma_1^H\gamma_2^H)^{1/2} \quad \text{Equation (2)}$$

Each component of the surface free energy of the resin molded member 3 to be substituted into Equation (2) is obtained by Equation (1). Similarly, each component of the surface free energy of the resin coating 23 to be substituted into Equation (2) is also obtained by Equation (1). If W obtained by Equation (2) is, for example, 45 mJ/m$^2$, 45 is substituted into X1 of Equation (A).

If the adhesion work W is large, the resin molded member 3 and the resin coating 23 can be said to be firmly adhered. The adhesion work W in the wire assembly 1 of this example is preferably 45 mJ/m$^2$ or more. If the value of the adhesion work W is 45 mJ/m$^2$or more, waterproofness between the resin molded member 3 and the resin coating 23 tends to be satisfactorily maintained. The adhesion work W is preferably 65 mJ/m$^2$ or more, more preferably 80 mJ/m$^2$ or more.

<<Distortion Difference>>

X2 of Example (A) and Equation (B) is a distortion difference. The distortion difference is a difference between the distortion of the resin molded member 3 and that of the resin coating 23 when a temperature changes from 90 °C to 20 °C X2 has no unit.

The resin molded member 3 is formed on the outer peripheries of the wire 2 and the end member 4 in the following procedure. Out of the wire 2 connected to the end member 4, an end part of the wire 2 including the end member 4 is arranged in a mold. Then, the material of the resin molded member 3 in a molten state is injected into the mold. A temperature of the mold is about 70° C. When the molten resin flows into the mold, the resin coating 23 arranged in the mold is heated to about 90 °C If the wire assembly 1 is removed from the mold, the wire assembly 1 is cooled to a room temperature. If the room temperature is 20° C., the temperature of the resin molded member 3 and that of the resin coating 23 change from 90 °C. to 20 °C during the manufacturing of the wire assembly 1. The resin molded member 3 is distorted due to a temperature change. Similarly, the resin coating 23 is also distorted. If there is a difference between the distortion of the resin molded member 3 and that of the resin coating 23, a stress acts on the interface between the resin molded member 3 and the resin coating 23. This stress is a force for pulling the resin molded member 3 away from the resin coating 23. Therefore, the difference between the distortion of the resin molded member 3 and that of the resin coating 23 can be said to be an index for evaluating waterproofness between the resin molded member 3 and the resin coating 23.

The distortion of each member can be obtained based on a linear expansion coefficient. The linear expansion coefficient of the resin molded member 3 and that of the resin coating 23 are measured by a method in accordance with JIS K 7197:2012.Specifically, these linear expansion coefficients are measured by TMA (thermomechanical analysis). In TMA, the linear expansion coefficient (1/°C) is obtained at every 10 °C. Specifically, a linear expansion coefficient X1 of from 20 °C to 30 °C, a linear expansion coefficient X2 of from 30 °C to 40 °C, a linear expansion coefficient X3of from 40 °C to 50 °C, a linear expansion coefficient X4 of from 50 °C to 60 °C, a linear expansion coefficient X5 of from 60 °C to 70 °C, a linear expansion coefficient X6 of from 70 °C to 80 °C, and a linear expansion coefficient X7 of from 80 °C to 90 °C are obtained. As shown in Equation (3) below, the distortion of each member can be obtained by multiplying the sum of the linear expansion coefficients from 90 °C to 20 °C by a temperature difference.

$$\text{Distortion} = (X1 + X2 + X3 + X4 + X5 + X6 + X7) \times 70 \quad \text{Equation (3)}$$

The distortion difference is an absolute value of the difference between the distortion of the resin molded member 3 obtained by Equation (3) and the distortion of the resin coating 23 obtained by Equation (3). If the distortion difference is small, it can be said that a strong stress hardly acts on the interface between the resin coating 3 and the resin coating 23. Therefore, the distortion difference is preferably 0.02 or less, more preferably 0.0129 or less, even more preferably 0.0011 or less.

<<Shear Adhesion Strength>

X3 of Equation (B) is shear adhesion strength. A unit of X3 is MPa.

Shear adhesion strength was obtained by dividing a load for causing adhesion destruction by a contact area when a tensile test of pulling the wire 2 and the resin molded member 3 in directions separating from each other was conducted. Therefore, the shear adhesion strength can be said to be an index for evaluating waterproofness between the resin molded member 3 and the resin coating 23.

The shear adhesion strength of this example can be obtained as follows. For example, the wire assembly 1 is cut at a position indicated by a two-dot chain line of FIG. 1. The outer periphery of the wire 2 and the resin molded member 3 are respectively chucked, and the wire 2 is pulled in a direction separating from the resin molded member 3 along the length direction of the wire 2. A pulling speed is 10 mm/min. A load when either the resin molded member 3 or the resin coating 23 is destroyed is measured. That load is divided by a contact area between the resin molded member 3 and the resin coating 23. A unit of the load is N, and a unit of the contact area is $mm^2$. The contact area is obtained by multiplying a circumferential length of the wire 2, i.e. a circumferential length of the resin coating 23, by a length L1. The circumferential length is obtained by multiplying a diameter of the wire 2 by $\pi$. The length Ll is a distance from the cut surface of the wire assembly 1 to an end part of the resin molded member 3 on the side of the wire 2.

If the shear adhesion strength of the resin molded member 3 and the resin coating 23 is large, the resin molded member 3 and the resin coating 23 can be said to be firmly adhered. Therefore, the shear adhesion strength is preferably 0.2 MPa or more, more preferably 0.8 MPa or more, even more preferably 1.5 MPa or more. If the measured shear adhesion strength is, for example, 0.2 MPa, 0.2 is substituted into X3 of Equation (B).

<<Linear Expansion Coefficient Difference>>

X4 of Equation (A) and Equation (B) is the linear expansion coefficient difference. A unit of X4 is 1/°C.

The linear expansion coefficient is related to an amount of expansion and contraction associated with a temperature change. Accordingly, if there is a difference between the linear expansion coefficient of the resin molded member 3 and that of the resin coating 23, a stress acts on the interface between the resin molded member 3 and the resin coating 23. Thus, the difference between the linear expansion coefficient of the resin molded member 3 and that of the resin coating 23 can be said to be an index for evaluating waterproofness between the resin molded member 3 and the resin coating 23. The linear expansion coefficient of the resin molded member 3 and that of the resin coating 23 are respectively obtained by TMA.

If the difference between the linear expansion coefficient of the resin molded member 3 and that of the resin coating 23 is large, peeling may occur at the interface between the resin molded member 3 and the resin coating 23 during the manufacturing of the wire assembly 1. If the linear expansion coefficient difference at 20 °C is $2.2\times10^{-4}$/°C or less, waterproofness between the resin molded member 3 and the resin coating 23 tends to be satisfactorily maintained. The linear expansion coefficient difference is more preferably $2.0\times10^{-4}$/°C or less, even more preferably $1.5\times10^{-4}$/°C or less.

<<Elastic Modulus>>

X5 of Equation (A) and Equation (B) is the elastic modulus of the resin coating 23. A unit of X5 is MPa.

As described above, the resin coating 23 of the wire 2 is heated in the mold during the manufacturing of the wire assembly 1. If the elastic modulus of the resin coating 23 is large, the resin coating 23 is significantly distorted in the process of removing the wire assembly 1 from the mold and cooling the resin coating 23 to the room temperature. A stress generated in the resin coating 23 due to this distortion may peel the resin molded member 3 from the resin coating 23. The stress is obtained by multiplying the distortion generated in the resin coating 23 by the elastic modulus of the resin coating 23. Accordingly, by selecting the resin coating 23 having a low elastic modulus, the resin molded member 3 becomes less likely to be peeled from the resin coating 23. Since the elastic modulus of the resin coating 23 is maximized at 20 °C in a temperature range of the resin coating 23 in the manufacturing process of the wire assembly 1, the elastic modulus of the resin coating 23 at 20 °C needs to be measured to evaluate waterproof performance. The elastic modulus is obtained by a measurement method in accordance with JIS K 7244.

If the elastic modulus of the resin coating 23 is 100 MPa or less, waterproofness between the resin molded member 3 and the resin coating 23 tends to be satisfactorily maintained. The elastic modulus is preferably 60 MPa or less, more preferably 20 MPa or less. If the measured elastic modulus is, for example, 100 MPa, 100 is substituted into X5 of Equation (A) or Equation (B).

(Test Example 1)

In this Test Example, data for obtaining Equation (A) or Equation (B) is obtained. Specifically, the wire assemblies 1 of samples No. 1 to No. 6, in which the material of the resin molded member 3 and that of the resin coating 23 were different, were fabricated. The resin molded member 3 is either a resin molded member A or a resin molded member B shown in Table 1. The resin molded member A is made of PA6T, which is a heat resistant PA resin. A melting point of the resin molded member A is 300° C. The resin molded member B is made of PA612, which is one type of a PA resin. A melting point of the resin molded member B is 220 °C.

TABLE 1

| | Material | Melting Point (° C.) |
|---|---|---|
| Resin Molded Member A | PA6T | 300 |
| Resin Molded Member B | PA612 | 220 |

The resin coating 23 is any one of a resin coating C, a resin coating D, a resin coating E, a resin coating F, a resin coating G and a resin coating H shown in Table 2. In Table 2, "YES" in a cross-linkage item of Table 2 means that the resin is cross-linked in the resin coating. "YES" in a filler item means that a filler is contained in the resin coating. "YES" in a flame retardant item means that a flame retardant is contained in the resin coating. The flame retardant was a metal hydroxide. A content of the filler in the resin coating C was 50 mass % when the resin coating C was 100 mass %. A content of the filler in the resin coating F was 40 mass % when the resin coating F was 100 mass %.

TABLE 2

| | Material | Cross-Linkage | Filler | Flame Retardant |
|---|---|---|---|---|
| Resin Coating C | PE Resin | NO | YES | NO |
| Resin Coating D | PU Resin | YES | NO | NO |
| Resin Coating E | PU Resin | NO | NO | NO |
| Resin Coating F | PE Resin | NO | YES | NO |
| Resin Coating G | PE Resin | YES | NO | NO |
| Resin Coating H | PE Resin | YES | NO | YES |

Figure 3:
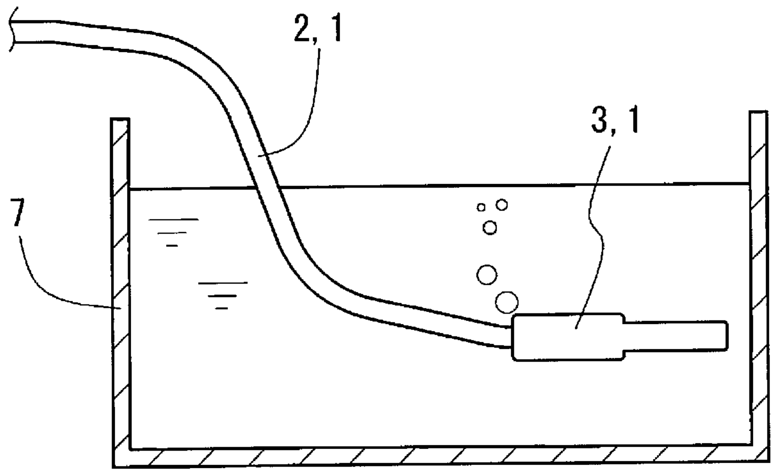
FIG. 3 is a schematic diagram of a testing device for Test Example 1.

The wire assemblies 1 of Samples No. 1 to No. 6 were subjected to the leak test. A summary of the leak test is shown in FIG. 3. As shown in FIG. 3, water was pooled in a water tank 7 and the resin molded member 3 of the wire assembly 1 was placed in water.

Subsequently, air was fed into the inside of the wire 2 from an end part opposite to the resin molded member 3 by an unillustrated air pump. An air pressure was gradually increased and a value of a pressure meter of the air pump was recorded when air leaked from a gap between the resin molded member 3 and the resin coating 23. The value of the pressure meter at the time of air leakage is called a leak pressure (kPa). If the leak pressure is 30 kPa or more, waterproofness can be judged to be satisfactory. If the leak pressure is 50 kPa or more, waterproofness can be judged to excellent. Leak pressure results are shown in Table 3. Table 3 also shows the material, the adhesion work (mJ/m$^2$), the distortion difference, the shear adhesion strength (MPa), the linear expansion coefficient difference and the elastic modulus (MPa) of the resin coating of each sample. Each physical quantity was measured in accordance with the method described in the embodiment.

TABLE 3

| | Sample No. | | | | | |
|---|---|---|---|---|---|---|
| | 1 | 2 | 3 | 4 | 5 | 6 |
| Resin Molded Member A | | | | ○ | ○ | ○ |
| Resin Molded Member B | ○ | ○ | ○ | | | |
| Resin Coating C | | ○ | | | | |
| Resin Coating D | ○ | | | | | |
| Resin Coating E | | | ○ | | | |
| Resin Coating F | | | | ○ | | |
| Resin Coating G | | | | | ○ | |
| Resin Coating H | | | | | | ○ |
| Adhesion Work (mJ/m$^2$) | 84 | 67 | 45 | 45 | 40 | 38 |
| Distortion Difference | 0.0011 | 0.0129 | 0.018 | 0.02 | 0.021 | 0.0215 |
| Shear Adhesion Strength (MPa) | 1.5 | 0.8 | 0.2 | 0.2 | 0.1 | 0.1 |
| Linear Expansion Coefficient Difference (1/° C.) | $1.1 \times 10^{-4}$ | $1.5 \times 10^{-4}$ | $2.0 \times 10^{-4}$ | $2.2 \times 10^{-4}$ | $2.2 \times 10^{-4}$ | $2.5 \times 10^{-4}$ |
| Elastic Modulus of Resin Coating (MPa) | 100 | 55 | 20 | 20 | 120 | 120 |
| Leak Pressure (kPa) | 170 | 100 | 55 | 45 | 10 | 5 |

As shown in Table 3, the leak pressures of the wire assemblies 1 of Samples No. 1 to No. 4, in which the adhesion work was 45 mJ/m$^2$ or more, significantly exceeded 30 kPa. The waterproofness of the wire assemblies 1 of Samples No. 1 to No. 4 can be judged to be satisfactory. By comparing Samples No. 1 to No. 4, it was found that the higher the adhesion work, the higher the leak pressure. Particularly, the leak pressures of Samples No. 1 and No. 2, in which the adhesion work was 65 mJ/m$^2$ or more, significantly exceeded 50 kPa.

From the results shown in Table 3, it was found that the leak pressure of the wire assembly 1 was 30 kPa or more if the distortion difference was 0.02 or less, the shear adhesion strength was 0.2 MPa or more, the linear expansion coefficient difference was $2.2\times10^{-4}$ or less and the elastic modulus of the resin coating was 100 MPa or less.

The multiple regression analysis is conducted using numerical values of the adhesion works, those of the distortion differences, those of the linear expansion coefficient differences, those of the elastic moduli of the resin coatings and those of the leak pressures of Samples No. 1 to No. 6 shown in Table 3. In the multiple regression analysis, coefficients a1, a2, a3 and the like and an intercept b in the following regression equation are calculated from data of an objective variable y and a plurality of explanatory variables x1, x2, x3 and the like.

$$y = a1 \times x1 + a2 \times x2 + a3 \times x3 + \ldots + b \qquad \text{Regression Equation}$$

In this example, the leak pressure is the objective variable. Each of the adhesion work, the distortion difference, the linear expansion coefficient difference and the elastic modulus of the resin coating is the explanatory variable. By the multiple regression analysis, Equation (A) can be obtained. Similarly, the multiple regression analysis is conducted using numerical values of the distortion differences, those of the shear adhesion strengths, those of the linear expansion coefficient differences, those of the elastic moduli of the resin coatings and those of the leak pressures of Samples No. 1 to No. 6 shown in Table 3. In this case, the leak pressure is the objective variable. Each of the distortion difference, the shear adhesion strength, the linear expansion coefficient difference and the elastic modulus of the resin coating is the explanatory variable. By the multiple regression analysis, Equation (B) can be obtained. By using Equation (A) or Equation (B), the leak pressure can be obtained without conducting the leak test even if the material or the like of the resin molded member 3 is changed.

| List of Reference Numerals | |
|---|---|
| 1 | wire assembly |
| 2 | wire |
| 2A | core wire |
| 2B | core wire |
| 20 | conductor |
| 21 | insulation layer |
| 23 | resin coating |
| 3 | resin molded member |
| 4 | end member |
| 7 | water tank |
| L0 | length |
| L1 | length |

What is claimed is:

1. A wire assembly, comprising:

a wire including a conductor and a resin coating;

an end member connected to the conductor at an end part of the wire; and a resin molded member for covering a region from the end member to the resin coating, a value of Y1 obtained by Equation (A) below being 30 or more, $$Y1 = 1.26 \times X1 - 5.02 \times 10^3 \times X2 + 1.55 \times 10^3 \times X4 - 2.36 \times 10^{-1} \times X5 + 93 \quad \text{Equation (A)}$$

where:

X1 . . . adhesion work of the resin molded member and the resin coating, having a unit of $mJ/m^2$, X2 . . . difference between distortion of the resin molded member and distortion of the resin coating, having no unit, X4 . . . difference between a linear expansion coefficient of the resin molded member and a linear expansion coefficient of the resin coating, having a unit of 1/°C, and X5 . . . elastic modulus of the resin coating, having a unit of MPa.

2. A wire assembly, comprising:

a wire including a conductor and a resin coating;

an end member connected to the conductor at an end part of the wire; and a resin molded member for covering a region from the end member to the resin coating, a value of Y2 obtained by Equation (B) below being 30 or more, $$Y2 = -3.59 \times 10^3 \times X2 + 4.99 \times 10 \times X3 - 1.20 \times 10^5 \times X4 - 2.65 \times 10^{-1} \times X5 + 139 \quad \text{Equation (B)}$$

where:

X2 . . . difference between distortion of the resin molded member and distortion of the resin coating, having no unit, X3 . . . shear adhesion strength of the resin molded member and the resin coating, having a unit of MPa, X4 . . . difference between a linear expansion coefficient of the resin molded member and a linear expansion coefficient of the resin coating, having a unit of 1/°C, and X5 . . . elastic modulus of the resin coating, having a unit of MPa.

3. The wire assembly of claim 1, wherein the resin molded member covers the entire end member.

4. The wire assembly of claim 1, wherein a main component of the resin molded member is a polyamide resin, a polyphenylene sulfide resin or a polybutylene terephthalate resin.

5. The wire assembly of claim 1, wherein a main component of the resin coating is a polyester or a polyurethane.

6. The wire assembly of claim 1, wherein the end member is a sensor.

* * * * *